(12) United States Patent
Parpia et al.

(10) Patent No.: US 8,468,487 B1
(45) Date of Patent: Jun. 18, 2013

(54) METHOD AND APPARATUS FOR IMPLEMENTING CROSS-TALK BASED BOOSTER WIRES IN A SYSTEM ON A FIELD PROGRAMMABLE GATE ARRAY

(75) Inventors: Zahir Parpia, Toronto (CA); Chris Wysocki, Toronto (CA); Vaughn Betz, Toronto (CA)

(73) Assignee: Altera Corporation, San Jose, CA (US)

( * ) Notice: Subject to any disclaimer, the term of this patent is extended or adjusted under 35 U.S.C. 154(b) by 169 days.

(21) Appl. No.: 12/386,739

(22) Filed: Apr. 22, 2009

(51) Int. Cl.
*G06F 17/50* (2006.01)

(52) U.S. Cl.
USPC ............ 716/128; 716/115; 716/126; 716/134

(58) Field of Classification Search
USPC .......................................... 716/128, 134, 115
See application file for complete search history.

(56) References Cited

U.S. PATENT DOCUMENTS

| | | | | |
|---|---|---|---|---|
| 6,128,347 | A * | 10/2000 | Nomura | 375/257 |
| 7,383,522 | B2 * | 6/2008 | Murgai et al. | 716/113 |
| 2006/0026539 | A1 * | 2/2006 | Tetelbaum et al. | 716/2 |

OTHER PUBLICATIONS van Dijk, Steven; Hely, David; "Reduction of Interconnect Delay by Exploiting Cross-talk," Sep. 18, 2001, Solid-State Circuits Conference, 2001.*
Wilton, Steven, "A Crosstalk-Aware Timing-Driven Router for FPGAs," Feb. 11, 2001, FPGA 2001.*

* cited by examiner

*Primary Examiner* — Vuthe Siek
*Assistant Examiner* — Eric Lee
(74) *Attorney, Agent, or Firm* — L. Cho (57) ABSTRACT

A method for designing a system on a field programmable gate array (FPGA) includes routing one or more booster wires alongside an interconnect to reduce a delay of a signal being transmitted on the interconnect. According to one aspect of the present invention, the routing of the one or more booster wires is performed in response to determining that a timing requirement of the system has not been met.

20 Claims, 10 Drawing Sheets

METHOD AND APPARATUS FOR IMPLEMENTING CROSS-TALK BASED BOOSTER WIRES IN A SYSTEM ON A FIELD PROGRAMMABLE GATE ARRAY

TECHNICAL FIELD

An embodiment of the present invention relates to electronic design automation tools for designing systems on target devices. More specifically, embodiments of the present invention relate to a method and apparatus for implementing cross-talk based booster wires in a system on a field programmable gate array (FPGA) to reduce signal delay.

BACKGROUND

Programmable logic devices such as FPGAs are used to implement large systems that may include million of gates and megabits of embedded memory. The complexity of large systems often requires the use of electronic design automation (EDA) tools to create and optimize a design for the system onto physical target devices. Among the procedures performed by EDA tools in a computer aided design (CAD) flow are synthesis, mapping, placement, and routing.

In semiconductor circuits such as programmable logic circuits, interconnect wires connecting two or more points on a chip typically are coupled to a driving buffer (inverter) and a receiver. The delay from the input of the driving buffer to the input of the receiver may be a function of the intrinsic delay of the driving buffer (delay without any loading), the resistance and capacitance of the interconnect wire, and the input capacitance of the receiver.

As design geometries shrink, a reduction in the spacing between wires occurs which results in increased interconnect capacitance. The wires in the programmable device also become thinner which results in an increase in interconnect resistance. Together, these factors cause the resistance and capacitance of the interconnect to play a larger role in impacting the delay from an input of the driving buffer to the input of the receiver.

SUMMARY

According to an embodiment of the present invention, one or more booster wires are added along a critical path of a system design in order to reduce the capacitance of a signal wire. An EDA tool identifies critical paths which could benefit from having signal delay reduced, breaks up a path into a set of signal buffer and interconnect, and identifies one or more booster buffers and booster wires available on a target device for use. An analysis is conducted which weighs the cost and beneficial impact of implementing the one or more booster wires. The beneficial impact of implementing a booster wire is influenced by the capacitance between the signal and booster wire, the amount of overlap between the signal and booster wire, and the offset in the transition edges in the signal and booster wires. The costs associated with implementing a booster wire include a delay penalty for adding booster buffers which present an additional load and additional power dissipation.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
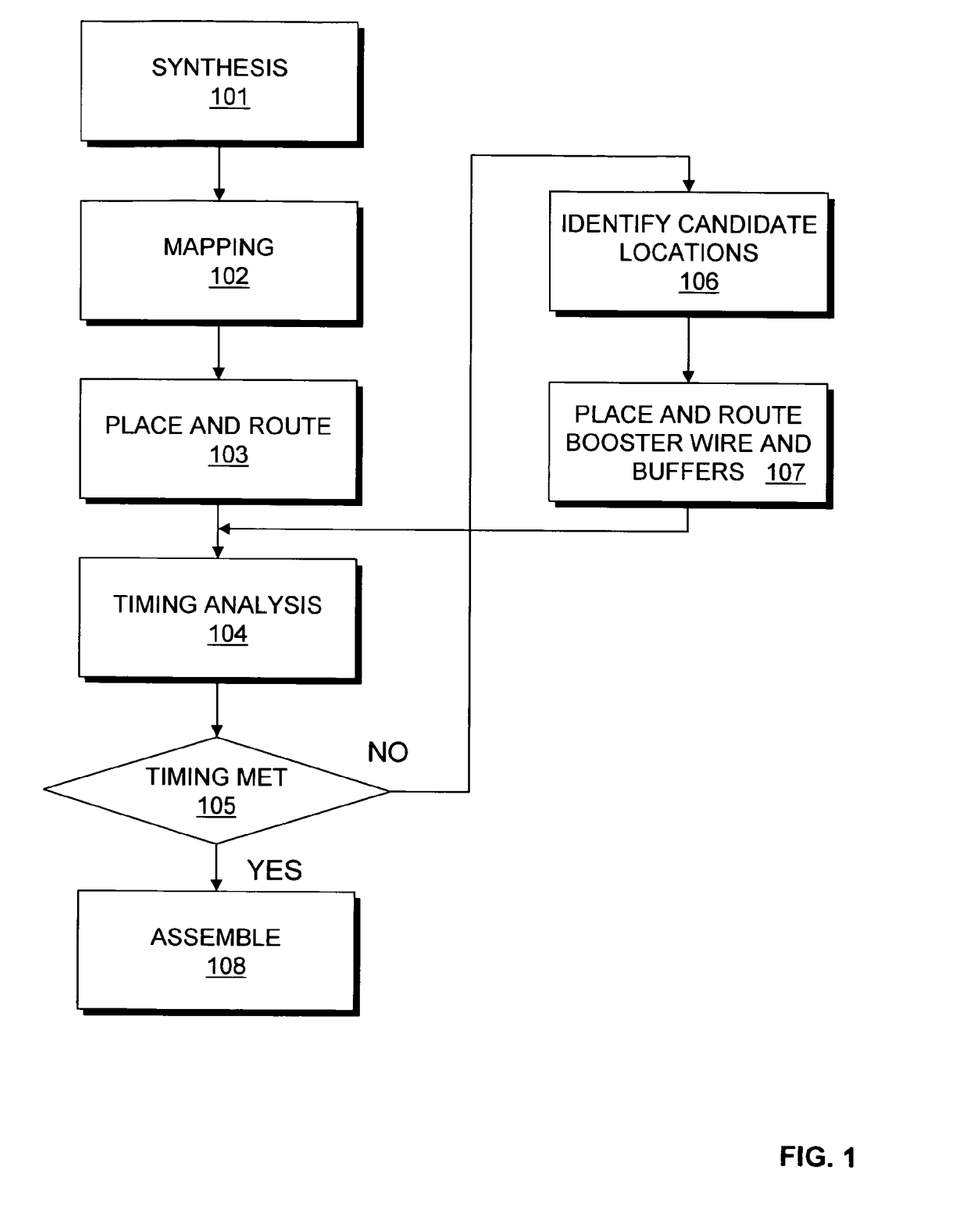
FIG. 1 is a flow chart illustrating a method for designing a system on a target device according to an embodiment of the present invention.

FIG. 1 is a flow chart illustrating a method for designing a system according to an embodiment of the present invention. The method may be performed by a system designer such as an EDA tool. The target device may be a programmable logic device (PLD) such as a field programmable gate array (FPGA) or other target device. At 101, synthesis is performed on a design of a system. According to an embodiment of the present invention, synthesis generates an optimized logical representation of the system from a HDL design definition. The optimized logical representation of the system may include a representation that has a minimized number of functional blocks such as logic gates, logic elements, and registers required for the system.

At 102, technology mapping is performed on the optimized logic design. Technology mapping includes determining how to implement logic gates and logic elements in the optimized logic representation with resources available on the target device. The resources available on the target device may be referred to as "cells" or "components" and may include logic-array blocks, registers, memories, digital signal processing blocks, input output elements, and/or other components. According to an embodiment of the present invention, an optimized technology-mapped netlist (cell netlist) is generated from the HDL.

At 103, the mapped logical system design is placed and routed. Placement works on the optimized technology-mapped netlist to produce a placement for each of the functional blocks. According to an embodiment of the present invention, placement includes fitting the system on the target device by determining which resources available on the target device are to be used for specific function blocks in the optimized technology-mapped netlist. According to an embodiment of the present invention, placement may include clustering which involves grouping logic elements together to form the logic clusters present on the target device. Routing the mapped logical system design involves determining which routing resources should be used to connect the components in the target device implementing the functional blocks of the system. During routing, routing resources on the target device are allocated to provide interconnections between logic gates, logic elements, and other components on the target device. The routing procedure may be performed by a router in an EDA tool that utilizes routing algorithms.

At 104, it is determined whether one or more timing requirements are met for the system for the synthesis, mapping, placement and routing solutions generated. Timing analysis is performed to determine one or more delay values for one or more paths in the system. A path may include a path for a signal through routing resources and/or through components. The one or more delay values may be output to a designer or user of the system. Alternatively, the timing analysis procedure 104 may be performed during or after synthesis procedure 101, mapping procedure 102, and/or placement and routing procedures 103.

At 105, if one or more timing requirements is not met for the system, control proceeds to 106. If the timing requirements are met for the system, control proceeds to 108.

At 106, candidate locations for booster wires and buffers are identified. According to an embodiment of the present invention, the candidate locations are locations that run alongside interconnects of paths identified to be critical for the purposes of timing (on the original signal wire).

At 107, resources available at the candidate locations are evaluated and placed and routed for booster wires and buffers. According to an embodiment of the present invention, the booster wires and buffers reduce delay of a signal and improve the timing of the system.

At 108, an assembly procedure is performed. The assembly procedure involves creating a data file that includes some of the information determined by the procedure described by 101-103 and 106-107. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

FIG. 1 illustrates timing analysis being performed after place and route. It should be appreciated that timing analysis may also be performed during place and route. According to an embodiment of the present invention, place and route performs its own timing analysis. If the place and route timing analysis indicates timing is not met, additional logic resources may be added.

Figure 2:
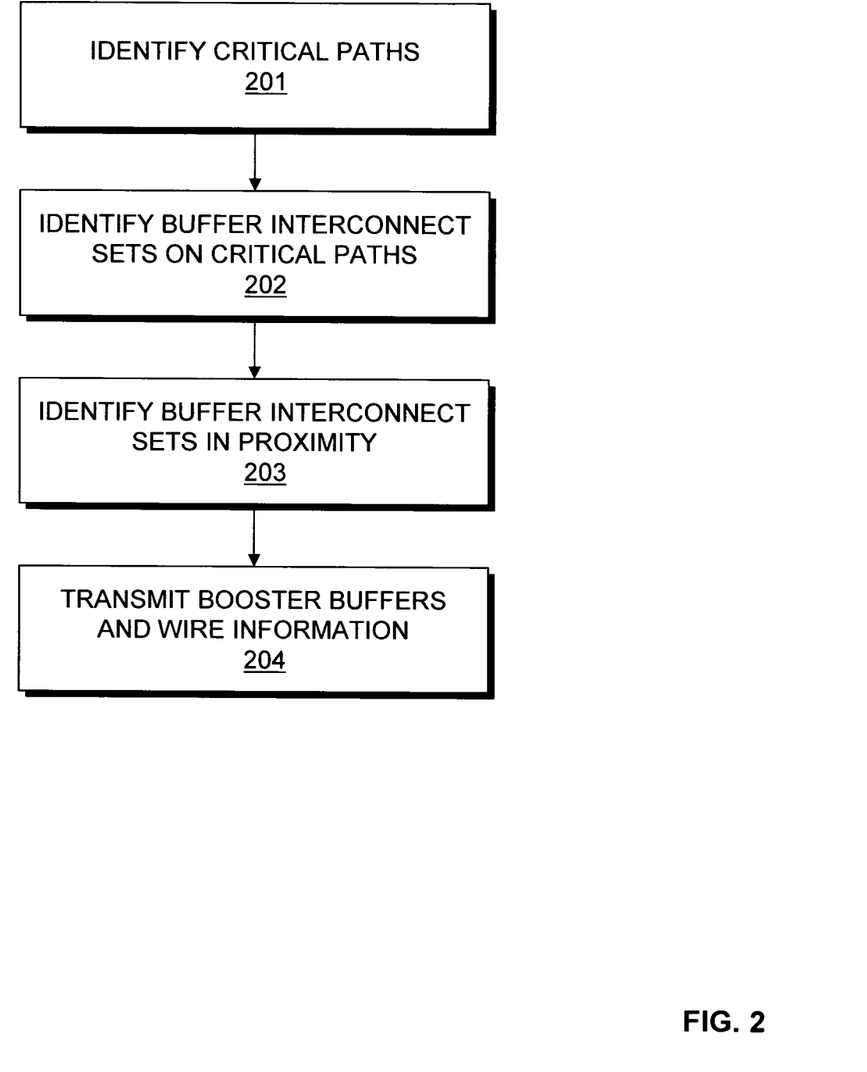
FIG. 2 is a flow chart illustrating a method for identifying candidate locations for booster wires and buffers according an embodiment of the present invention.

FIG. 2 is a flow chart illustrating a method for identifying candidate locations for booster wires and booster buffers according an embodiment of the present invention. The procedure illustrated in FIG. 2 may be used to implement procedure 106 illustrated in FIG. 1. At 201, critical paths in the system that require or that could benefit by having signals on the paths sped up are identified. A path may include a set of routing resources used in a register to register path. A critical path may be a path for which timing is not met or for which timing is met but the path has very little slack. According to an embodiment of the present invention, the critical paths could be identified using slack/slack ratio analysis or using another type of procedure.

At 202, for each critical path, buffer and interconnect sets that make up the path are identified. An interconnect may be a wire or a segment of a wire on the system.

At 203, additional buffer and interconnect sets within proximity of the identified sets of buffer and interconnect that make up the path are identified. The additional buffer and interconnect sets that are available are identified as candidates for forming booster buffers and booster wires.

At 204, the locations of the additional available buffer and interconnect sets are transmitted as candidate locations to be placed and routed as booster buffers and booster wires. According to an embodiment of the present invention, the locations are transmitted to a placement and routing unit in an EDA tool or system designer.

According to an embodiment of the present invention, buffer interconnect sets on critical paths are identified and buffer interconnect sets in proximity to the sets on the critical paths are identified as candidate locations for booster buffers and booster wires. It should be appreciated that the critical path may be defined as a path transmitting a signal which does not meet timing requirements of the system. Thus, in this embodiment, candidate locations for booster buffers and booster wires are identified only for paths which cause the system to miss timing requirements.

Figure 3:
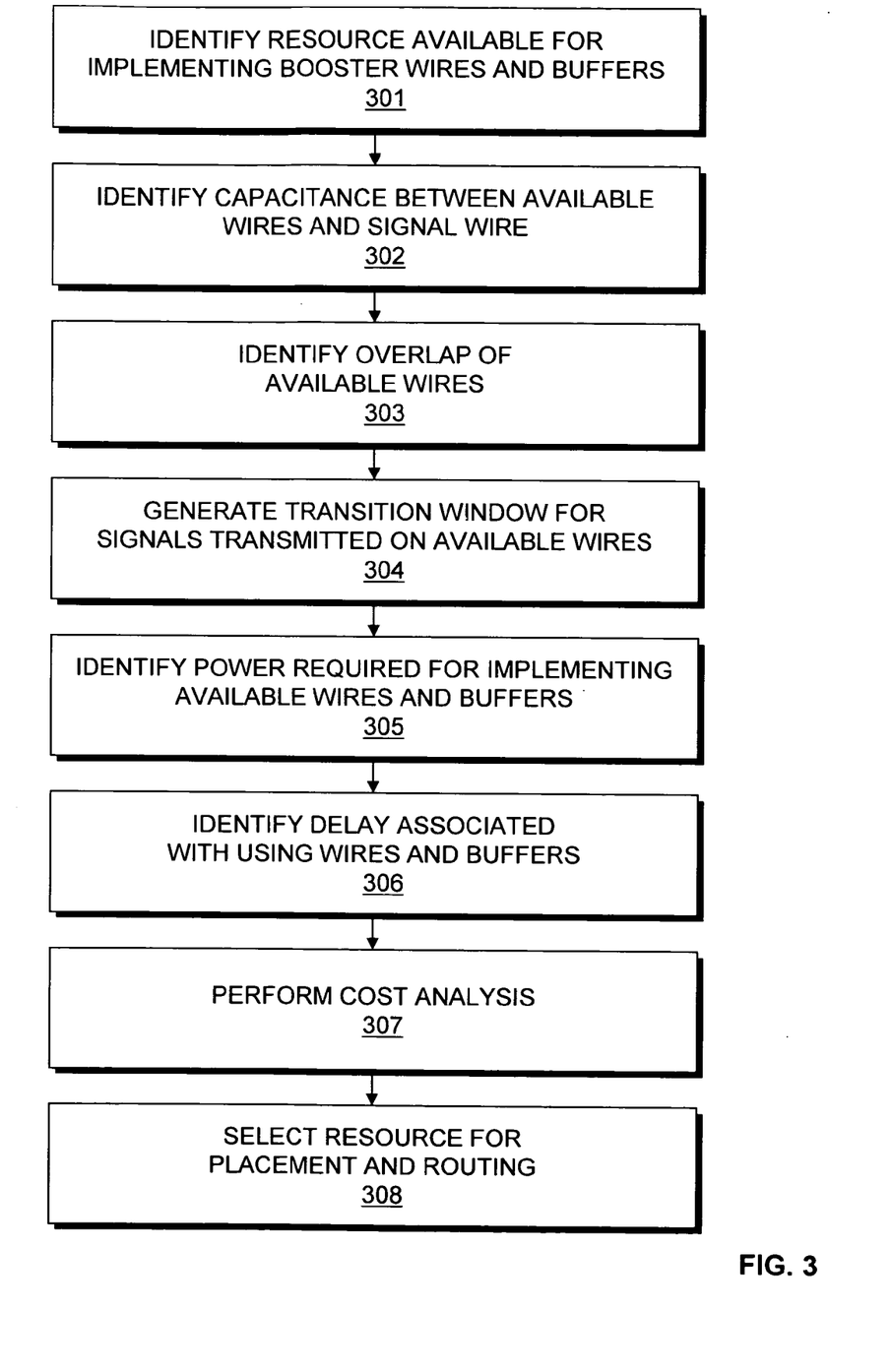
FIG. 3 is a flow chart illustrating a method for placing and routing booster wires and buffers according to an embodiment of the present invention.

FIG. 3 is a flow chart illustrating a method for placing and routing booster wires and booster buffers according to an embodiment of the present invention. The procedure illustrated in FIG. 3 maybe used to implement procedure 107 illustrated in FIG. 1. At 301, given the candidate locations for booster buffers and booster wires, resources available on a target device for implementing the booster buffers and booster wires are identified. According to an embodiment of the present invention, actual buffer components and vertical and horizontal wires on the target device that are available are identified. It should be appreciated that the resources identified for implementing the booster buffers and booster wires may reside on a same layer as the signal wire or on a layer above or below the signal wire on a multi-layered target device. Whether a booster buffer or booster wire is identified as being available may depend on whether a connection within the target device is being used, routing constraints, routing congestion, and/or other criteria.

At 302, the capacitance between each available booster wire and signal wire is identified. According to an embodiment of the present invention, the capacitance may be modeled as distributed or lumped capacitance.

At 303, the overlap between each available booster wire and signal wire is identified. According to an embodiment of the present invention, a signal wire corresponding to a critical path may include a plurality of interconnects. It should be appreciated that one or more available buffer and interconnect sets on the target device may be utilized to form a booster wire to run alongside the signal wire. According to an embodiment of the present invention, for a booster wire to run alongside the signal wire, the booster wire is adjacent to the signal wire and is in close physical proximity to the signal wire where no other wire is between the two. The booster wire may completely overlap the signal wire, running alongside the signal wire from end to end. Alternatively, the booster wire may partially overlap the signal wire, running alongside only a portion of the signal wire.

At 304, transition windows for signals transmitted on available booster wires are generated. The transition window identifies an amount of offset permitted between a signal transmitted on a signal wire and a signal transmitted on a booster wire that still allows the booster wire to reduce delay on the signal wire. According to an embodiment of the present invention, if a transition edge for a signal on a booster wire lines up with the signal wire transition edge and the signals are transitioning in the same direction, the effective capacitance between the signal on the signal wire and signal on the booster wire is zero and delay push-in or a reduction in the signal wire delay is achieved. There may still be a reduction in signal wire delay even with an offset in the transition edges between the signal transmitted on the signal wire and a signal transmitted on a booster wire as long as the offset is within the transition window. It should be appreciated that the transition windows may be computed using simulation, estimation, or other technique.

At 305, power dissipation resulting from implementing each available booster buffer and booster wire is computed. According to an embodiment of the present invention, the power dissipation may be computed using simulation, estimation, or other technique.

At 306, delay resulting for implementing each available booster buffer and booster wire is computed. According to an embodiment of the present invention, the delay may be computed using simulation, estimation, or other technique.

At 307, a cost analysis is performed on using the booster buffers and booster wires available. The cost analysis may take into account the capacitance between the available booster wires and a signal wire, the overlap between available booster wires and the signal wire, where a signal on a booster wire transitions relative to a transition window, power dissipation associated with booster buffers and booster wires, delay resulting for implementing booster buffers and booster wires, and/or other criteria.

At 308, based upon the cost analysis performed at 307, the resources available for implementing booster buffers and booster wires are selected and place and routed in the system.

Figure 4:
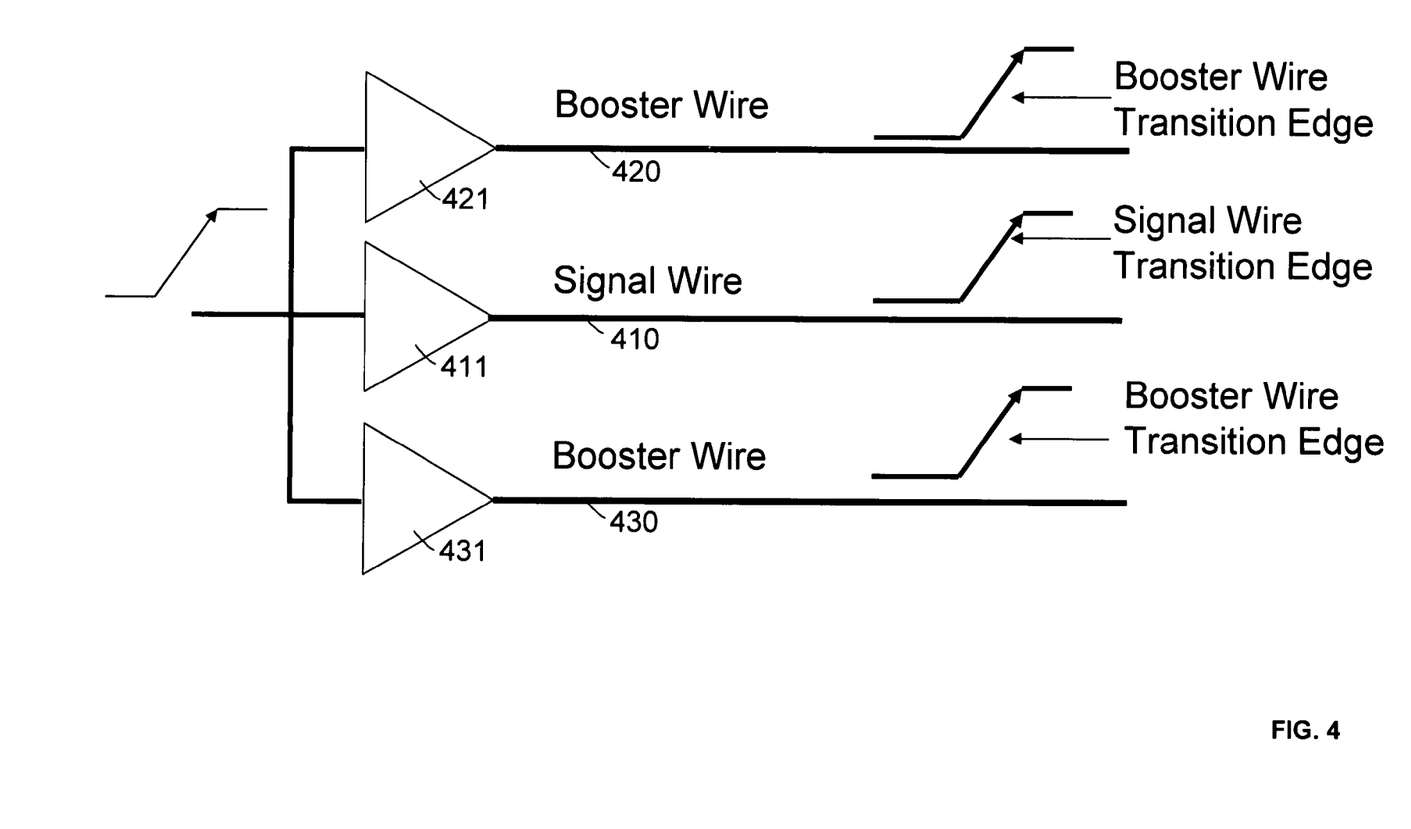
FIG. 4 illustrates a high level view of booster wires placed and routed alongside a signal wire according to an embodiment of the present invention.

FIG. 4 is a high level illustration of booster wires placed and routed alongside a signal wire according to an embodiment of the present invention. Wire 410 represents an original signal wire in a system design that is a part of a critical path that transmits a signal. The signal wire 410 is coupled to buffer 411. Upon determining that the system could benefit from having the signal on the signal wire 410 sped up, a first booster wire 420 and a first booster buffer 421 is identified and coupled to the signal wire 410. A second booster wire 430 and a second booster buffer 431 may also be identified and coupled to the signal wire 410. The booster wires 420 and 430 are driven by the same input as the signal wire 410. When the booster wire transition edges line up with the signal wire transition edge and the signals on the wires transition in the same direction, the effective capacitance between the signal wire 410 and the booster wires 420 and 430 is zero. A delay push-in or reduction in signal wire delay results.

Figure 5:
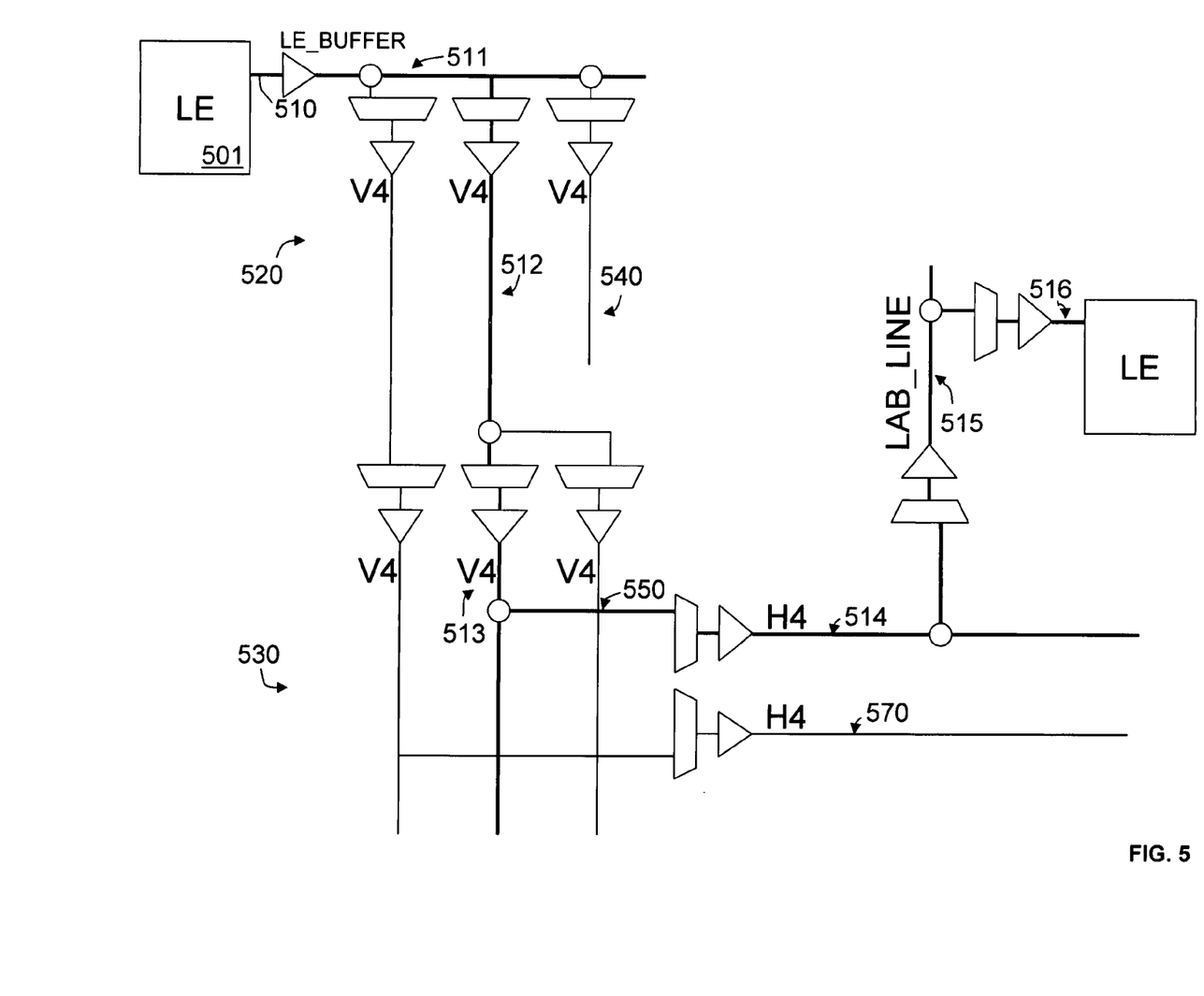
FIG. 5 illustrates booster wires placed and routed alongside a signal wire in an FPGA according to an embodiment of the present invention.

FIG. 5 illustrates booster wires placed and routed alongside a signal wire on an FPGA 500 according to an embodiment of the present invention. Signal wire 510 includes a plurality of buffer interconnect sets 511-516 that transmits a signal from a source 501 to one or more destinations. The signal wire 510 may be a critical path for transmitting the signal. According to an embodiment of the present invention, a plurality of available buffer interconnect sets may be identified on the FPGA 500 to operate as booster wires. For example, vertical 4 (V4) signal wire segments including buffer interconnect sets 512 and 513 on the signal wire 510 may be boosted by a first booster wire 520 that includes a buffer interconnect set. The first booster wire 520 may be extended and coupled to a second booster wire 530 that includes another buffer interconnect set. The V4 wire segments including buffer interconnect sets 512 and 513 on the signal wire 510 may also be boosted by a third booster wire 540 that includes a buffer interconnect set. The third booster wire 540 does not have the connectivity to be extended and does not completely overlap both buffer interconnect sets 512 and 513. However, a fourth booster wire 550 may be coupled to another junction in the signal wire 510 to provide further boosting along the same side of booster wire 540. Horizontal 4 (H4) signal wire segment that includes buffer interconnect set 514 on the signal wire 510 is boosted by booster wire 570 that includes a buffer interconnect set. The LAB_LINE is not boosted.

Figure 6:
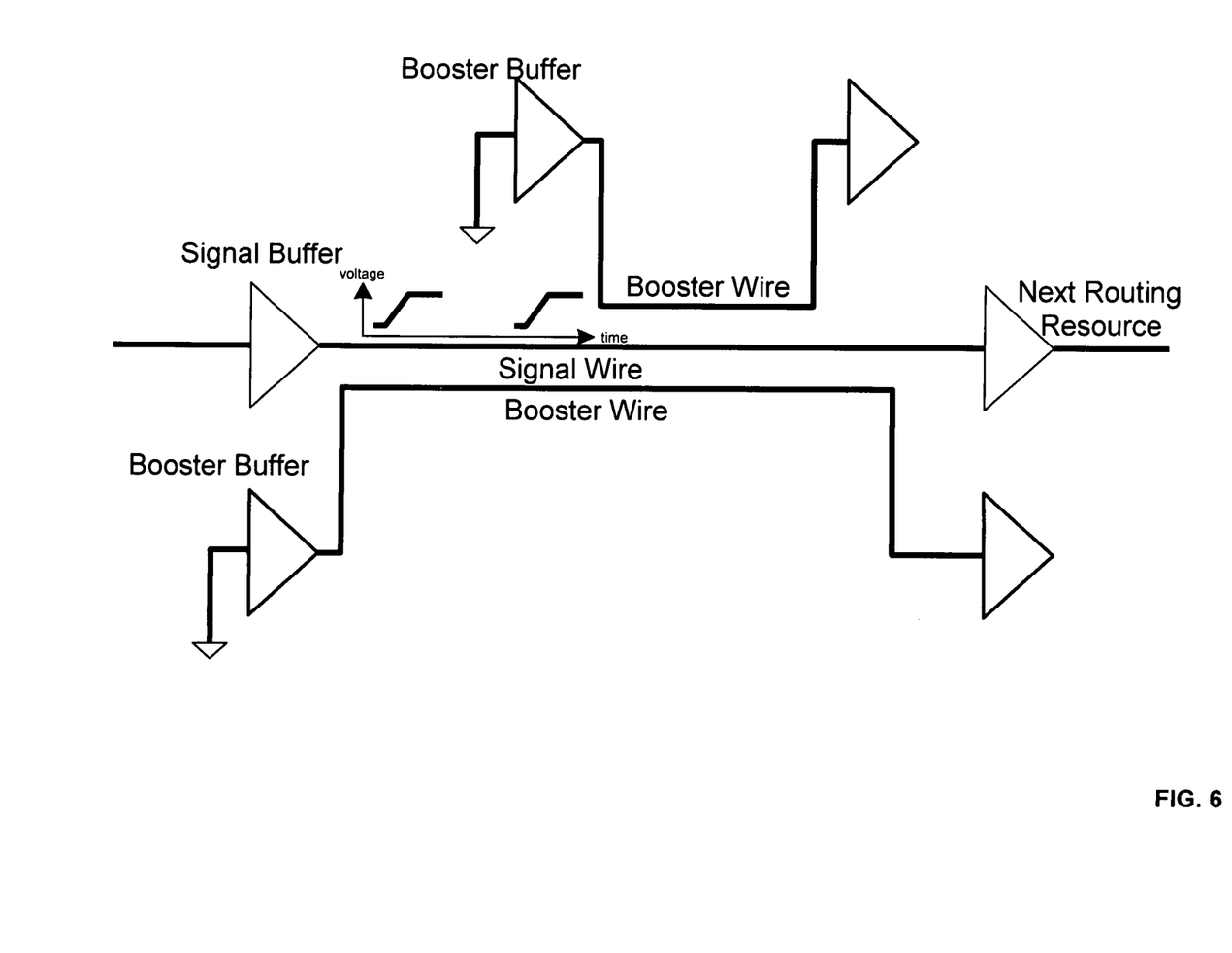
FIG. 6 illustrates booster wires placed and routed alongside a signal wire to reduce crosstalk according to an embodiment of the present invention.

FIG. 6 illustrates booster wires placed and routed alongside a signal wire to reduce crosstalk according to an embodiment of the present invention. Whether a target device such as an FPGA is capable of boosting certain signal wires or segments of signal wires to reduce capacitance may be subject to the availability of connections within the architecture and routing constraints and routing congestion. A further limitation may include whether synchronization of signals on the booster wires and the signal wire is possible. If the transition edge of a signal on the signal wire and a booster wire cannot be synchronized such that the signals are transmitted within a transmission window, a decision may be made not to use the booster wire to transmit a signal. The booster wire may still be used to benefit the system by holding the booster wire at a constant potential, such as at a high or zero potential, to protect against the wire being used to route a signal that could potentially slow down the signal wire. For example, if a signal wire and a wire running along side it are transitioning in opposite directions, a delay pushout results which increases the signal wire delay, which is undesirable. When using a booster wire to hold a constant potential, there is no speed gained by using the booster wire, but the booster wire is prevented from being used in a manner that might slow down the signal wire through crosstalk.

Figure 10:
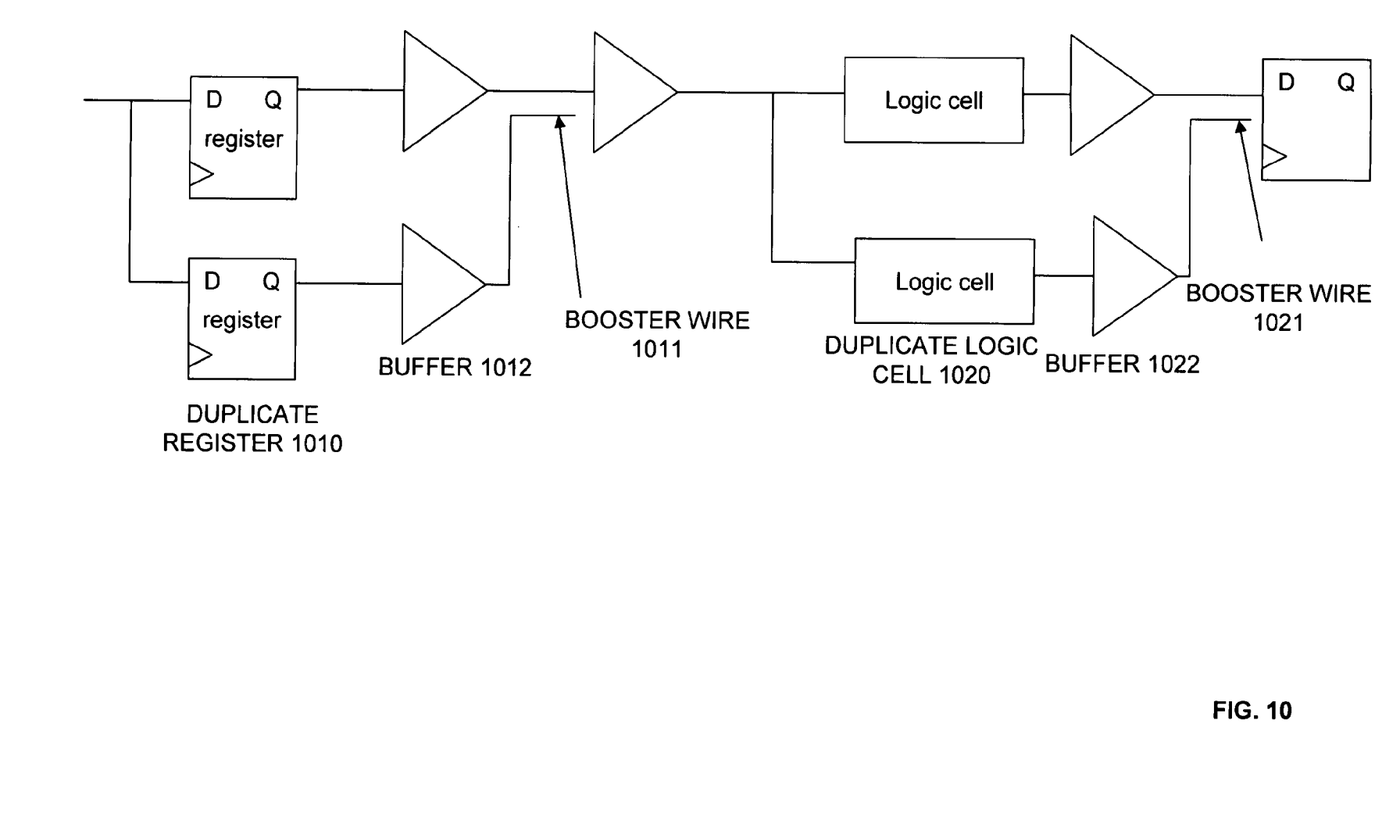
FIG. 10 illustrates booster wires with logic resources that are placed and routed alongside a signal wire to reduce crosstalk according to an embodiment of the present invention.

According to an embodiment of the present invention, instead of placing and routing booster wires and buffers, booster wires may be placed and routed with logic cells or registers instead of or in addition to buffers. The duplication of logic resources that include logic cells or registers instead of or in addition to buffers may improve the placement and routing procedure. It should be appreciated that this aspect of the invention may be implemented in the procedures described in FIGS. 1-3. FIG. 10 illustrates an example of a duplicate register 1010 placed and routed with booster wire 1011 and buffer 1012, and a duplicate logic cell 1020 placed and routed with booster wire 1021 and buffer 1022.

Figure 7:
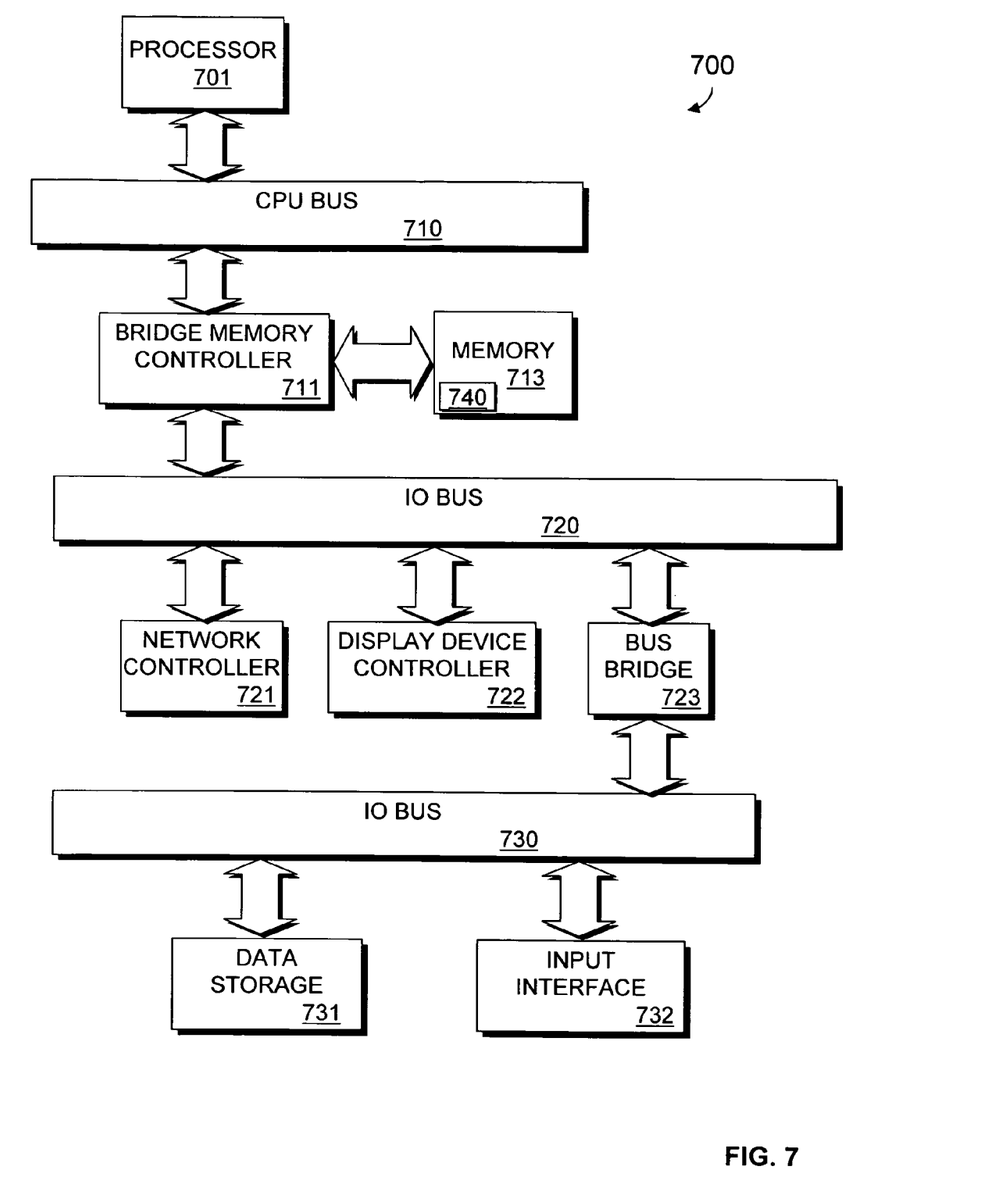
FIG. 7 illustrates a computer system that is used to implement the system designer according to an embodiment of the present invention.
Figure 8:
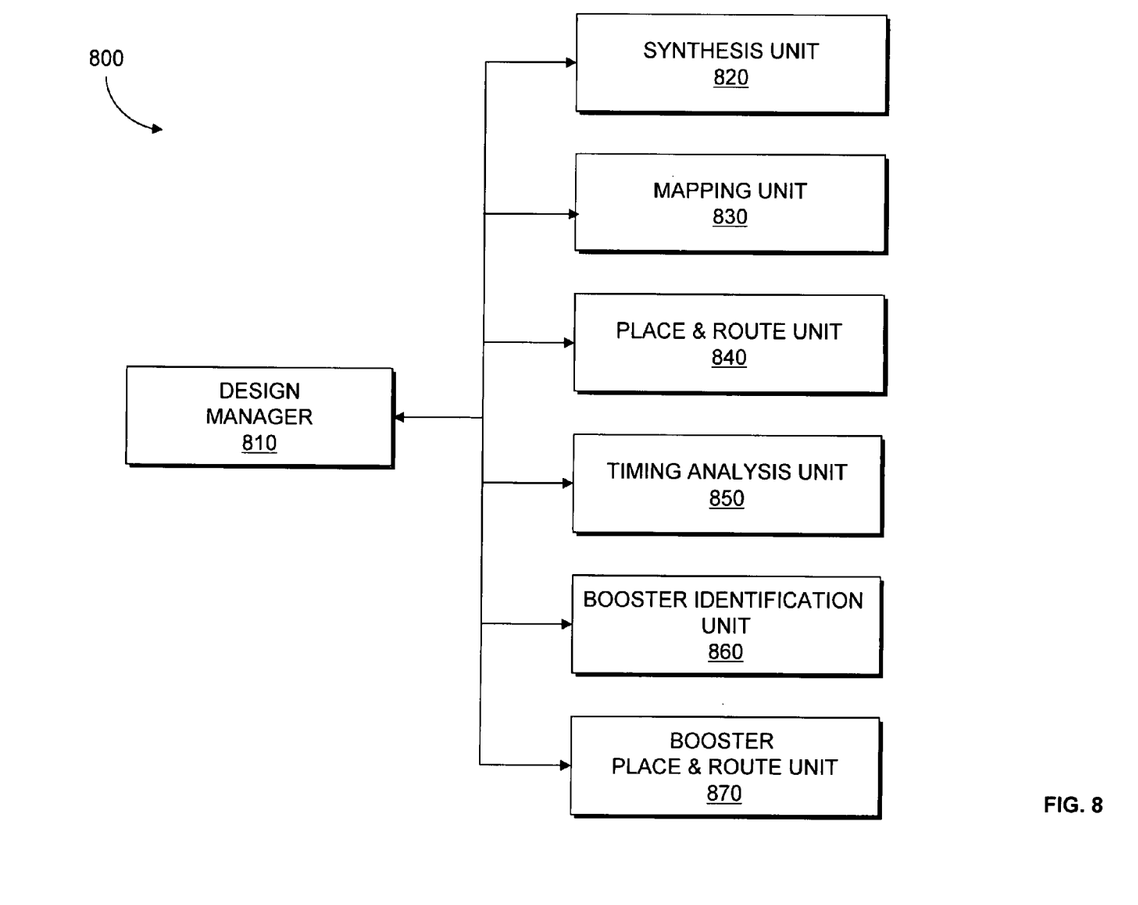
FIG. 8 illustrates a system designer according to an embodiment of the present invention.

FIG. 7 is a block diagram of an exemplary computer system 700 in which an example embodiment of the present invention resides. The computer system 700 may be used to implement a system designer as shown in FIG. 8. The computer system 700 includes a processor 701 that processes data signals. The processor 701 is coupled to a CPU bus 710 that transmits data signals between processor 701 and other components in the computer system 700.

The computer system 700 includes a memory 713. The memory 713 may store instructions and code represented by data signals that may be executed by the processor 701.

A bridge memory controller 711 is coupled to the CPU bus 710 and the memory 713. The bridge memory controller 711 directs data signals between the processor 701, the memory 713, and other components in the computer system 700 and bridges the data signals between the CPU bus 710, the memory 713, and a first 10 bus 720.

The first 10 bus 720 may be a single bus or a combination of multiple buses. The first 10 bus 720 provides communication links between components in the computer system 700. A network controller 721 is coupled to the first 10 bus 720. The network controller 721 may link the computer system 700 to a network of computers (not shown) and supports communication among the machines. A display device controller 722 is coupled to the first 10 bus 720. The display device controller 722 allows coupling of a display device (not shown) to the computer system 700 and acts as an interface between the display device and the computer system 700.

A second 10 bus 730 may be a single bus or a combination of multiple buses. The second 10 bus 730 provides communication links between components in the computer system 700. A data storage device 731 is coupled to the second 10 bus 730. The data storage device 731 may be a hard disk drive, a floppy disk drive, a CD-ROM device, a flash memory device or other mass storage device. An input interface 732 is coupled to the second 10 bus 730. The input interface 732 may be, for example, a keyboard and/or mouse controller or other input interface. The input interface 732 may be a dedicated device or can reside in another device such as a bus controller or other controller. The input interface 732 allows coupling of an input device to the computer system 700 and transmits data signals from an input device to the computer system 700. A bus bridge 723 couples the first 10 bus 720 to the second 10 bus 730. The bus bridge 723 operates to buffer and bridge data signals between the first 10 bus 720 and the second 10 bus 730. It should be appreciated that computer systems having a different architecture may also be used to implement the computer system 700.

A system designer 740, may reside in memory 713 and be executed by processor 701. The system designer 740 may operate to synthesize a system, map the system, place the system on a target device, route the system, perform timing analysis on a design for the system, and routing one or more booster wires alongside an interconnect in response to determining that a timing requirement of the system has not been met.

FIG. 8 illustrates a system designer 800 according to an embodiment of the present invention. The system designer 800 may be an EDA tool for designing a system on a target device. The target device may be, for example, an FPGA, a PLD, or other circuitry. Furthermore the logic design may be implemented using semiconductor or nanoelectronic technology. FIG. 8 illustrates software modules implementing an embodiment of the present invention. According to one embodiment, system design may be performed by a computer system executing sequences of instructions represented by the software modules shown in FIG. 8. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 800 includes a designer manager 810. The designer manager 810 receives a design for a system. The design may be described at a gate level or in a more abstract level. The design may be described in terms of an HDL such as VHDL or Verilog. The target device may be an ASIC, structured ASIC, FPGA, PLD, or other target device. The designer manager 810 is connected to and transmits data between the components of the system designer 800.

Block 820 represents a synthesis unit that performs synthesis. The synthesis unit 820 generates a logic design of a system to be implemented in the target device. According to an embodiment of the system designer 800, the synthesis unit 820 takes a conceptual HDL design definition and generates an optimized logical representation of the system. The optimized logical representation of the system generated by the synthesis unit 820 may include a representation that has a minimized number of functional blocks and registers, such as logic gates and logic elements, required for the system. Alternatively, the optimized logical representation of the system generated by the synthesis unit 820 may include a representation that has a reduced depth of logic and that generates a lower signal propagation delay.

Block 830 represents a mapping unit. The mapping unit 830 performs technology mapping. Technology mapping involves determining how to implement the functional blocks and registers in the optimized logic representation utilizing specific resources on a target device thus creating an optimized "technology-mapped" netlist. The technology-mapped netlist illustrates how the resources (components) on the target device are utilized to implement the system.

Block 840 represents a place and route unit that performs placement and routing. The place and route unit 840 places the system on to the target device by determining which components or areas on the target device are to be used for specific functional blocks and registers. According to an embodiment of the system designer 800, the placement unit 840 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The place and route unit 840 may utilize a cost function in order to determine a good assignment of resources on the target device. The place and rout unit 840 also determines the routing resources on the target device to use to provide interconnection between the components implementing functional blocks and registers of the logic design.

Block 850 represents a timing analysis unit. The timing analysis unit 850 may perform timing analysis to determine one or more delay values for one or more paths in the system. A path may include a path for a signal through routing resources and/or through components.

Block 860 represents a booster identification unit. The booster identification unit 860 identifies critical paths through a system and identifies booster wires and booster buffers in response to determining from timing analysis unit 850 that a timing requirement for a system has not been met. According to an embodiment of the present invention, candidate locations for the booster wires and booster buffers are identified that run alongside interconnects of paths identified to be critical for the purposes of timing (on the original signal wire). The booster identification unit 860 may perform the procedures described with reference to FIG. 2.

Block 870 represents a booster place and route unit. The booster place and route unit 870 receives the candidate locations of booster wires and booster buffers from the booster identification unit 860. The booster place and route unit 870 evaluates and selectively places and routes the booster wires and buffers. According to an embodiment of the present invention, the booster place and route unit 870 may perform the procedures described with reference to FIG. 3 to evaluate candidate locations of booster wires and booster buffers.

According to an embodiment of the system designer 800, the design manager 810 performs an assembly procedure that creates a data file that includes the design of the system generated by the system designer 800. The data file may be a bit stream that may be used to program the target device. The design manager 810 may output the data file so that the data file may be stored or alternatively transmitted to a separate machine used to program the target device. It should be appreciated that the design manager 810 may also output the design of the system in other forms such as on a display device or other medium.

Figure 9:
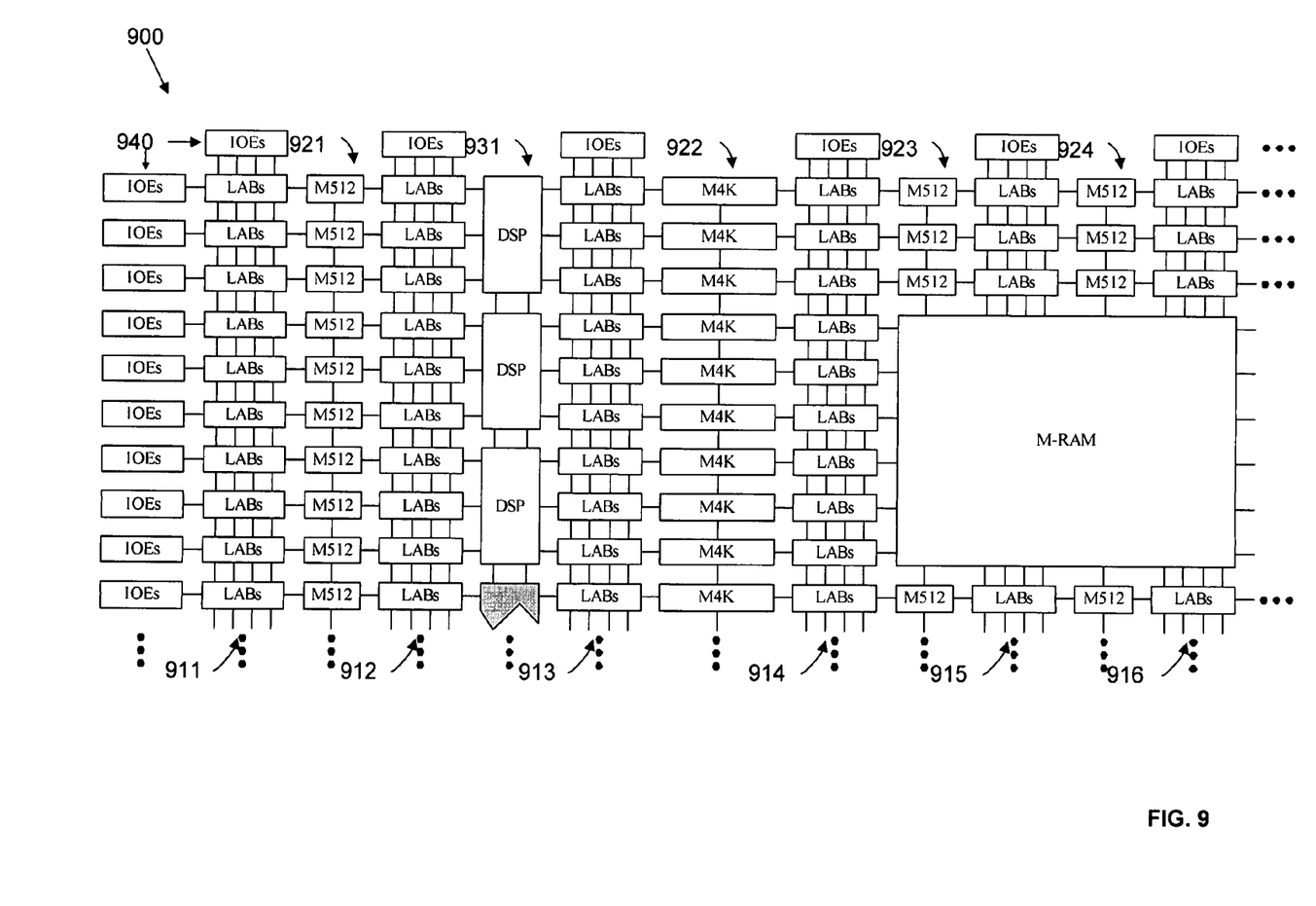
FIG. 9 illustrates a target device which booster wires and buffers may be implemented on according to an embodiment of the present invention.

FIG. 9 illustrates an exemplary target device 900 in which a system may be implemented on utilizing an FPGA according to an embodiment of the present invention. According to one embodiment, the target device 900 is a chip having a hierarchical structure that may take advantage of wiring locality properties of circuits formed therein.

The target device 900 includes a plurality of logic-array blocks (LABs). Each LAB may be formed from a plurality of logic blocks or logic elements, carry chains, shared arithmetic chains, LAB control signals, and register chain connection lines. A logic block is a small unit of logic providing efficient implementation of user logic functions. A logic block includes one or more LUT-based resources, logic gates, programmable registers, and a single output. Depending on its architecture, a logic block may also include dedicated adders, a carry chain, an arithmetic chain, and a register train. LABs are grouped into rows and columns across the target device 900. Columns of LABs are shown as 911-916. It should be appreciated that the logic block may include additional or alternate components.

The target device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 900. Columns of memory blocks are shown as 921-924.

The target device 200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 900 and are shown as 931.

The target device 900 includes a plurality of input/output elements (IOEs) 940. Each 10E feeds an I/O pin (not shown) on the target device 900. The IOEs are located at the end of LAB rows and columns around the periphery of the target device 900.

The target device 900 includes LAB local interconnect lines (not shown) that transfer signals between LEs in the same LAB, a plurality of row interconnect lines ("H-type wires") (not shown) that span fixed distances, and a plurality of column interconnect lines ("V-type wires") (not shown) that operate similarly to route signals between components in the target device.

FIG. 9 illustrates an exemplary embodiment of a target device. It should be appreciated that a system may include a plurality of target devices, such as that illustrated in FIG. 9, cascaded together. It should also be appreciated that the target device may include programmable logic devices arranged in a manner different than that on the target device 900. A target device may also include FPGA resources other than those described in reference to the target device 900. Thus, while the invention described herein may be utilized on the architecture described in FIG. 9, it should be appreciated that it may also be utilized on different architectures, such as those employed by Altera Corporation or Xilinx Inc.

FIGS. 1-3 are flow charts illustrating methods according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a field programmable gate array (FPGA), the method comprising:
   identifying a critical path that routes a signal in the system;
   identifying candidate locations for one or more booster wires for the system in response to identifying the critical path, wherein the one or more booster wires is coupled to the critical path and transmits the signal and the candidate locations are in a position such that the one or more booster wires is directly adjacent to the critical path; and
   routing the one or more booster wires alongside the critical path to reduce a delay of the signal, wherein at least one of the identifying and routing procedures are performed using a computer.

2. The method of claim 1, further comprising:
   routing the system on the FPGA; and performing timing analysis on the system to determine whether a timing requirement of the system has been met.

3. The method of claim 1, wherein identifying the candidate locations for the one or more booster wires comprises:
identifying a buffer and an interconnect on the critical paths; and
identifying one or more available sets of buffer and interconnect on the FPGA within a fixed proximity of the identified buffer and interconnect on the critical path as candidate locations for the one or more booster wires for the system.

4. The method of claim 1 further comprising performing a cost analysis on available routing resources for implementing the one or more booster wires alongside the critical path.

5. The method of claim 4, wherein the cost analysis accounts for a capacitance between one or more available wires to be used as the one or more booster wires and a signal wire.

6. The method of claim 4, wherein the cost analysis accounts for an amount of overlap of one or more available wires to be used as the one or more booster wires.

7. The method of claim 4, wherein the cost analysis accounts for transition times for a signal on an available wire to be used as a booster wire and a signal on the critical path.

8. The method of claim 4, wherein the cost analysis accounts for power required for implementing the one or more booster wires.

9. The method of claim 4, wherein the cost analysis accounts for delay incurred for using the one or more booster wires.

10. The method of claim 1, wherein the one or more booster wires reduce capacitance on the critical path.

11. A non-transitory computer-readable medium including sequences of instructions, the sequences of instructions including instructions which when executed by a computer causes the computer to perform a method, the method comprising:
routing a system on a field programmable gate array (FPGA);
performing timing analysis on the system;
identifying a critical path in the system in response to identifying a failure to meet a timing requirement of the system;
identifying one or more available sets of buffer and interconnect on the FPGA as candidate booster wires for the critical path in response to identifying the critical path, wherein the candidate booster wires are coupled to the critical path and carry a signal transmitted on the critical path and the candidate booster wires are at locations where the candidate booster wires are directly adjacent to the interconnect of the critical path; and
routing one or more of the candidate booster wires alongside an interconnect of the critical path.

12. The non-transitory computer-readable medium of claim 11, wherein the one or more of the candidate booster wires reduce capacitance on the interconnect.

13. The non-transitory computer-readable medium of claim 11, wherein the method further comprises performing a cost analysis on the one or more available sets of buffer and interconnect.

14. The non-transitory computer-readable medium of claim 13, wherein the cost analysis accounts for a capacitance, an amount of overlap, and transition time for a signal on the one or more available sets of buffer and interconnect.

15. The non-transitory computer-readable medium of claim 13, wherein the cost analysis accounts for power required for implementing the one or more available sets of buffer and interconnect, and delay incurred for using the one or more available sets of buffer and interconnect.

16. A design system comprising:
a timing analysis unit operable to determine whether timing for a system routed on a field programmable gate array has been met; and
a booster identification unit operable to identify candidate locations for routing one or more booster wires alongside an interconnect corresponding to a critical path such that no other wire is between the one or more booster wires and the interconnect in response to identifying a failure to meet a timing requirement on the critical path, wherein the one or more booster wires is coupled to the critical path and carries a signal transmitted on the critical path.

17. The design system of claim 16, further comprising a booster place and route unit operable to routes a logic resource to drive the one or more booster wires.

18. The design system of claim 17, wherein the logic resource comprises a register.

19. The design system of claim 17, wherein the logic resource comprises a logic cell.

20. The design system of claim 17, where the logic resource comprises a buffer.

* * * * *